(12) United States Patent
Tanaka

(10) Patent No.: US 12,002,191 B2
(45) Date of Patent: Jun. 4, 2024

(54) DATA PROCESSING SYSTEM AND DATA PROCESSING METHOD

(71) Applicant: KYOCERA Document Solutions Inc., Osaka (JP)

(72) Inventor: Kazunori Tanaka, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 357 days.

(21) Appl. No.: 17/597,804

(22) PCT Filed: Jul. 17, 2020

(86) PCT No.: PCT/JP2020/027797
§ 371 (c)(1),
(2) Date: Jan. 24, 2022

(87) PCT Pub. No.: WO2021/015117
PCT Pub. Date: Jan. 28, 2021

(65) Prior Publication Data
US 2022/0254003 A1   Aug. 11, 2022

(30) Foreign Application Priority Data
Jul. 25, 2019   (JP) ................................ 2019-136942

(51) Int. Cl.
*G06V 30/12*   (2022.01)
*G06T 7/00*   (2017.01)
*G06T 7/11*   (2017.01)

(52) U.S. Cl.
CPC ............. *G06T 7/0002* (2013.01); *G06T 7/11* (2017.01); *G06T 2207/20081* (2013.01)

(58) Field of Classification Search
CPC ................... G06T 7/0002; G06T 7/11; G06T 2207/20081; G06V 10/255; G06V 10/987; G06V 30/127
See application file for complete search history.

(56) References Cited

U.S. PATENT DOCUMENTS 11,449,686 B1*  9/2022 Panchal ................. G06F 40/51
2009/0245625 A1* 10/2009 Iwaki ................... H04N 1/3872
382/173

FOREIGN PATENT DOCUMENTS

JP   2016-062524 A   4/2016

* cited by examiner

*Primary Examiner* — Said M Elnoubi
(74) *Attorney, Agent, or Firm* — Studebaker & Brackett PC

(57) ABSTRACT

Storage (24) stores therein a teacher model (54) that is a target image (50) with a teacher annotation (52), which specifies the target image (50), assigned thereto. An inferring section (32) assigns based on the teacher model (54) an inferred annotation (82) to an inspection image (80) belonging to the same category to which the target image (50) belongs. The inferred annotation (82) is a result of inference from the inspection image (80) based on the teacher model (54). An aiding section (34) aids a human to determine whether or not the inferred annotation (82) specifies the inspection image (80). A correcting section (36) generates a corrected model (86) in a manner to add a corrected annotation (84) to the inferred annotation (82) so that the inspection image (80) is specified.

7 Claims, 11 Drawing Sheets

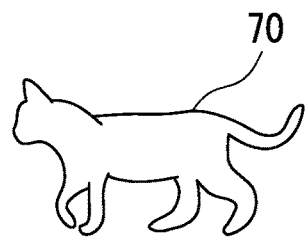
FIG. 5A
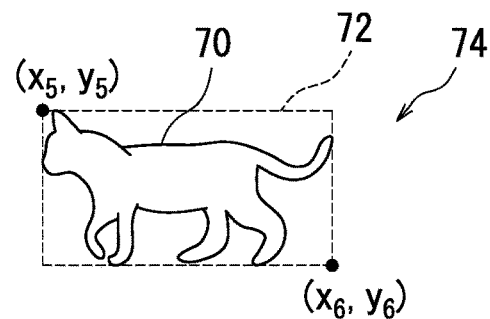
FIG. 5B
| Teacher model 1 | $(x_1,y_1)(x_2,y_2)$ |
| Teacher model 2 | $(x_3,y_3)(x_4,y_4)$ |
| | |
| Inferred model 1 | $(x_5,y_5)(x_6,y_6)$ |
| Inferred model 2 | $(x_7,y_7)(x_8,y_8)$ |
FIG. 6

| | 130 |
|---|---|
| Teacher model 1 | この国では、技術が急速に発展しています。<br>Technolgy is rapidly developing in this country. |
| ⋮ | ⋮ |
| Inferred model 1 | この国では、高齢化が急速に進んでいます。<br>Aging is rapidly advancing in this contry. |
| ⋮ | ⋮ |
| Corrected model 2 | この国では、高齢化が急速に進んでいます。<br>Aging is rapidly developing in this country.<br>developing → advancing |
| ⋮ | ⋮ |

FIG. 13

DATA PROCESSING SYSTEM AND DATA PROCESSING METHOD

TECHNICAL FIELD

The present invention relates to a data processing system and a data processing method.

BACKGROUND ART

Patent Literature 1 discloses a data processing system including: a learning means that generates a model by learning a relationship between a teacher label assigned to at least one area of a learning image and an image of the area; and a detection means that receives an inspection image different from the learning image and detects based on the model an area including a target from each of the inspection image before being subjected to the predetermined image processing and the inspection image having been subjected to the predetermined image processing.

CITATION LIST

Patent Literature

[Patent Literature 1] Japanese Patent Application Laid-Open Publication No. 2016-62524

SUMMARY OF INVENTION

Technical Problem

However, the data processing system disclosed in Patent Literature 1 does not perform determination based on the model as to whether or not each detected area includes the target in the inspection image. As such, bother in label assignment to the learning image cannot be favorably reduced.

The present invention has been made in view of the foregoing and has its object of providing a data processing system and a data processing method that can favorably reduce operation for inferred annotation correction.

Solution to Problem

According to an aspect of the present invention, the data processing system includes storage, an inferring section, an aiding section, and a correcting section. The storage stores therein a teacher model that is a target image with a teacher annotation assigned thereto. The teacher annotation specifies the target image. The inferring section assigns an inferred annotation to an inspection image belonging to a same category to which the target image belongs. The inferred annotation is a result of inference from the inspection image based on the teacher model. The aiding section aids a human to determine whether or not the inferred annotation specifies the inspection image. The correcting section generates a corrected model in a manner to add a corrected annotation to the inferred annotation so that the inspection image is specified.

According to another aspect of the present invention, a data processing method includes: inputting a target image; assigning to the target image a teacher annotation that specifies the target image; storing a teacher model that is the target image with the teacher annotation assigned thereto; inputting an inspection image; assigning an inferred annotation to the inspection image belonging to a same category to which the target image belongs, the inferred annotation being a result of inference from the inspection image based on the teacher model; aiding a human to determine whether or not the inferred annotation specifies the inspection image; and generating a corrected model in a manner to add a corrected annotation to the inferred annotation so that the inspection image is specified.

Advantageous Effects of Invention

According to the present invention, operation for inferred annotation correction can be favorably reduced.

BRIEF DESCRIPTION OF DRAWINGS

FIG. 5A is a diagram illustrating an inspection image in the data processing system of the embodiment.

FIG. 5B is a diagram illustrating an inferred model in the data processing system.

FIG. 6 illustrates a list that the data processing device has.

FIG. 13 illustrates a list that the data processing device has.

DESCRIPTION OF EMBODIMENTS

Figure 1:
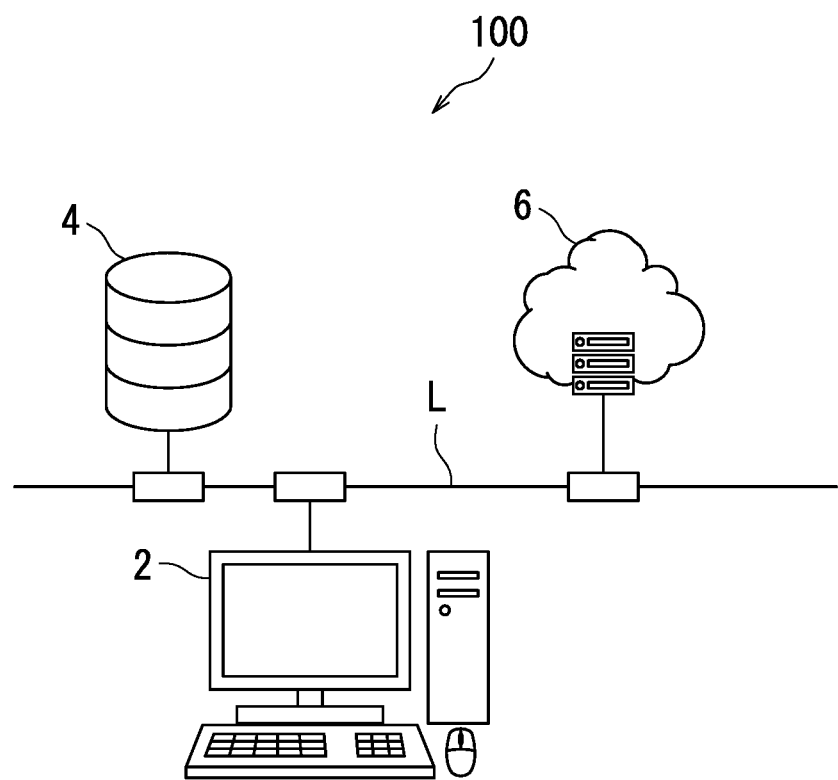
FIG. 1 is a diagram illustrating a data processing system according to an embodiment of the present invention.

The following describes embodiments of the present invention with reference to the accompanying drawings. Note that elements that are the same or equivalent are labeled with the same reference signs in the drawings and description thereof is not repeated.

First Embodiment

A data processing system 100 according to a first embodiment will be described with reference to FIGS. 1 to 8. FIG.

Figure 2:
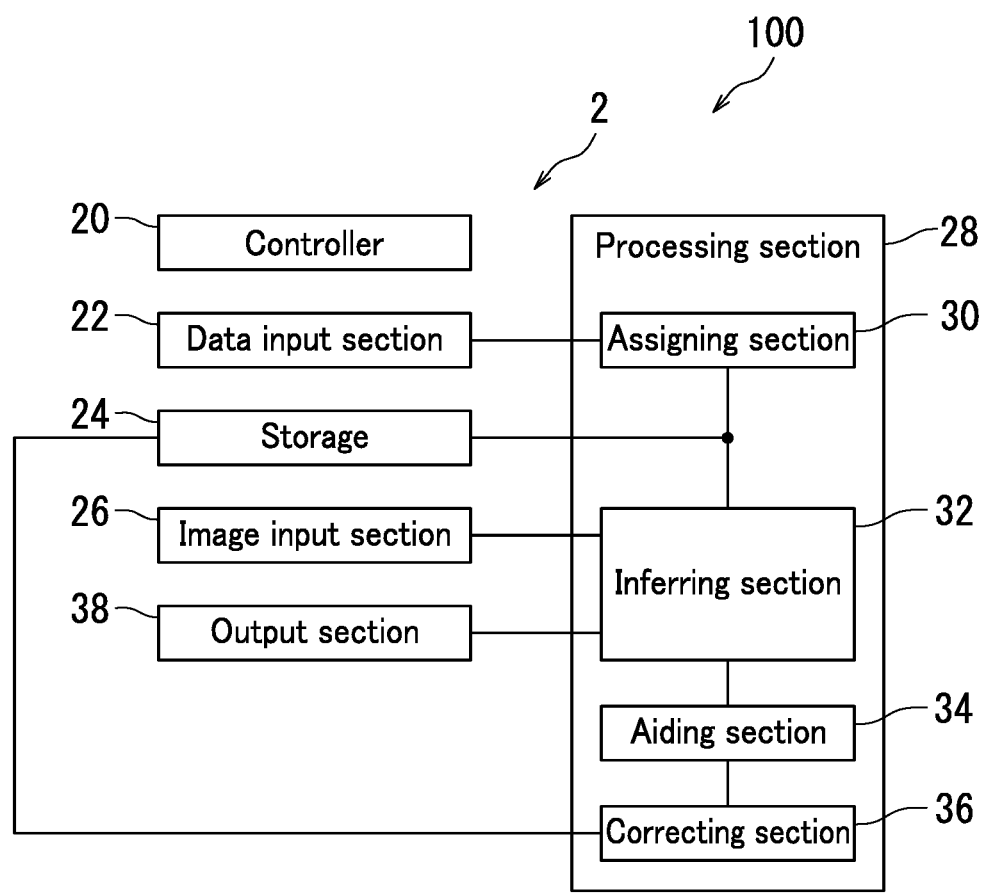
FIG. 2 is a block diagram of a data processing device included in the data processing system of the embodiment.
Figure 3A:
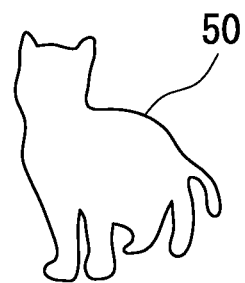
FIG. 3A is a diagram illustrating a target image in the data processing system of the embodiment.
Figure 3B:
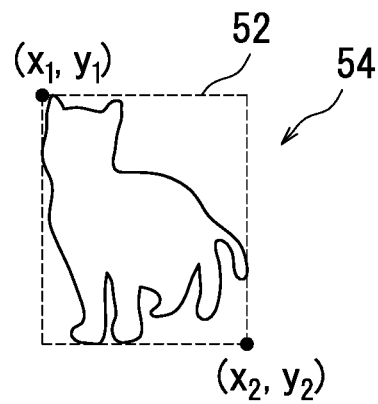
FIG. 3B is a diagram illustrating a teacher model in the data processing system.

1 is a diagram illustrating the data processing system 100 according to the present embodiment. FIG. 2 is a block diagram of a data processing device 2 included in the data processing system 100 of the present embodiment. FIG. 3A is a diagram illustrating a target image 50 in the data processing system 100. FIG. 3B is a diagram illustrating a teacher model 54 in the data processing system 100.

Figure 4:
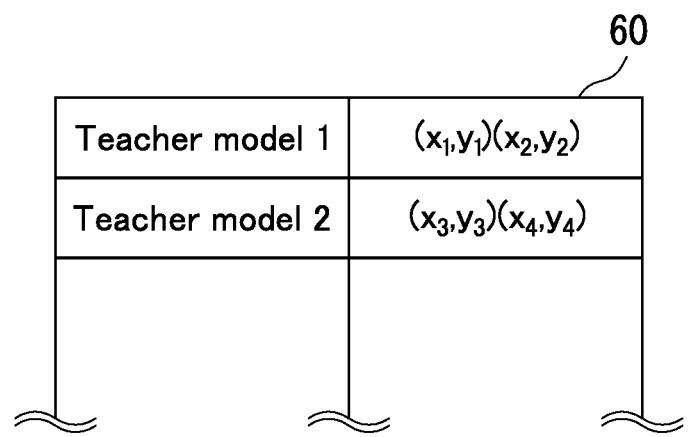
FIG. 4 illustrates a list that the data processing device has.

FIG. 4 illustrates a list 60 that the data processing device 2 has. FIG. 5A is a diagram illustrating an inspection image 70 in the data processing system 100. FIG. 5B is a diagram illustrating an inferred model 74 in the data processing system 100. FIG. 6 illustrates a list 60 that the data processing device 2 has.

Figure 7A:
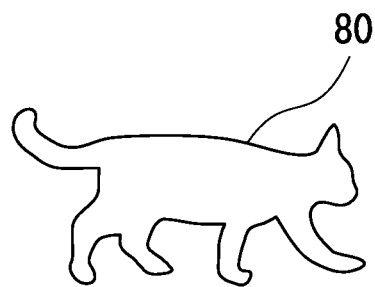
FIG. 7A is a diagram illustrating an inspection image in the data processing system of the embodiment.
Figure 7B:
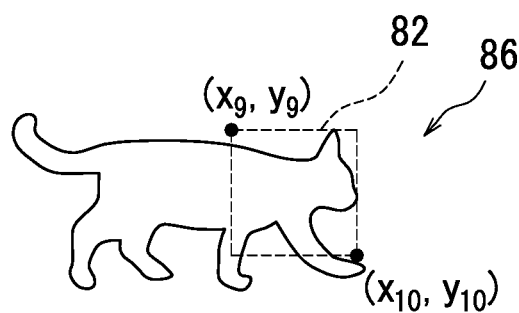
FIG. 7B is a diagram illustrating an inferred annotation in the data processing system.
Figure 7C:
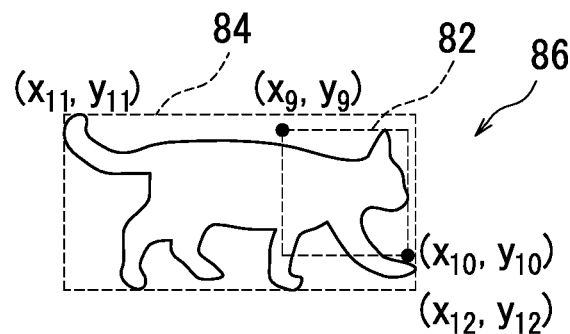
FIG. 7C is a diagram illustrating a corrected model in the data processing system.
Figure 8:
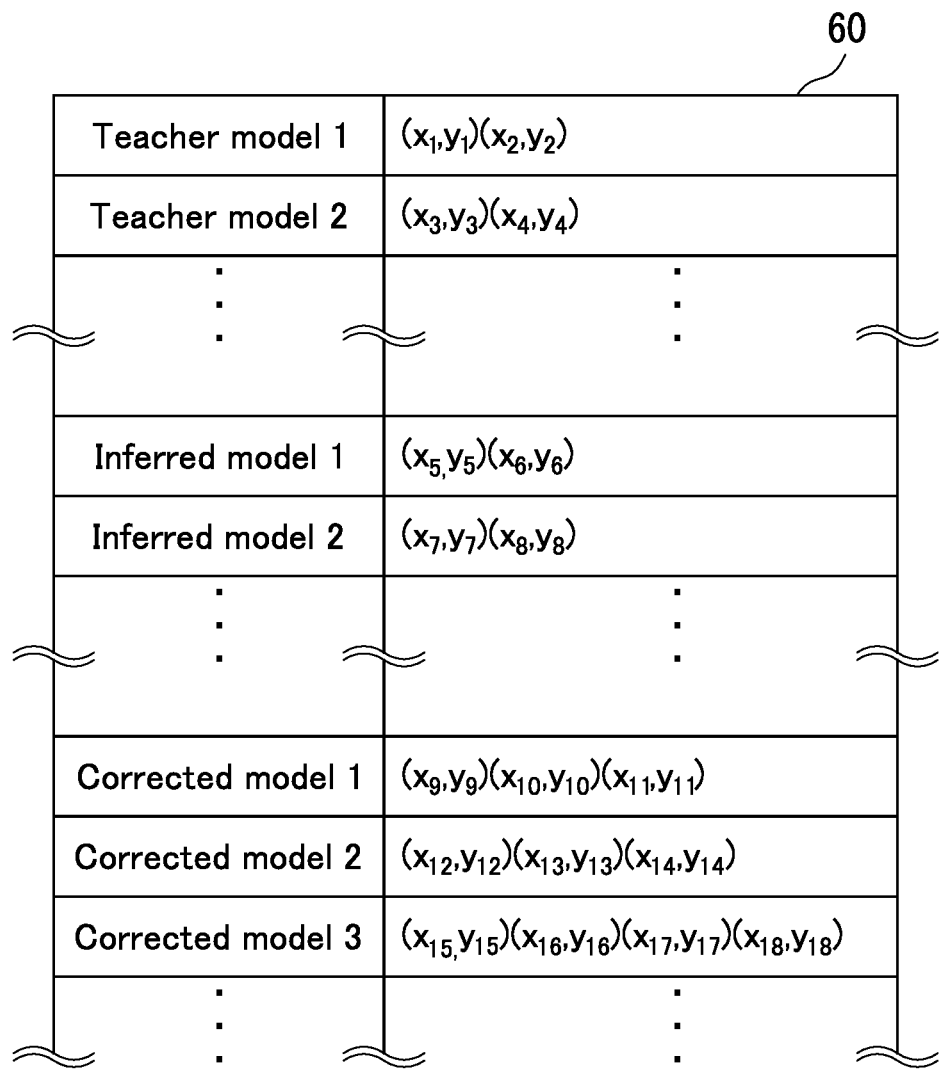
FIG. 8 illustrates a list that the data processing device has.

FIG. 7A is a diagram illustrating an inspection image 80 in the data processing system 100. FIG. 7B is a diagram illustrating an inferred annotation 82 in the data processing system 100. FIG. 7C is a diagram illustrating a corrected model 86 in the data processing system 100. FIG. 8 illustrates a list 60 that the data processing device 2 has.

As illustrated in FIG. 1, the data processing system 100 includes the data processing device 2, a server 4, and cloud 6. The data processing device 2, the server 4, and the cloud 6 are connected to one another via a line L.

The line L is a local area network (LAN) or a wide area network (WAN), for example. The line L is not limited to either a wireless line or a wired line.

The data processing device 2 included in the data processing system 100 will be described next with reference to FIG. 2. FIG. 2 is a diagram illustrating the data processing device 2 in the present embodiment.

As illustrated in FIG. 2, the data processing device 2 includes a controller 20, a data input section 22, storage 24, an image input section 26, a processing section 28, and an output section 38. The processing section 28 includes an assigning section 30, an inferring section 32, an aiding section 34, and a correcting section 36.

The storage 24 or the processing section 28 may be disposed in the server 4 or the cloud 6.

The data processing device 2 is a personal computer, for example. A security camera is connected to the personal computer, for example. The security camera captures an image of a landscape and outputs image data thereof. The security camera may be used for crime prevention, for example.

That is, the personal computer is used for the purpose of identifying a specific cat or the like in a manner that an image of a cat is extracted from the landscape image by analyzing the image data acquired from the security camera.

The controller 20 controls the operation of the data processing device 2. The controller 20 includes a central processing unit (CPU), for example.

The data input section 22 receives a target image 50. The data input section 22 may acquire the target image 50 from the server 4 or the cloud 6. Alternatively, the data input section 22 may acquire the target image 50 from the outside via the Internet by a user operating the data processing device 2.

As illustrated in FIG. 3A, the target image 50 is an image of a cat, for example. The target image 50 may be an image of a plurality of cats belonging to the same category.

The assigning section 30 assigns a teacher annotation 52 to the target image 50. The teacher annotation 52 specifies the target image 50 in a manner to bound the target image 50 with a rectangular frame as indicated by the broken line in FIG. 3B. The teacher annotation 52 contains coordinate data $(x_1, y_1)$ and coordinate data $(x_2, y_2)$ representing two points that define a boundary region of the target image 50 which can be defined by at least two points. The teacher annotation 52 is given by bounding called bounding box.

The entire body of the cat that is the target image 50 is included in the boundary region defined by the two points represented by the coordinate data $(x_1, y_1)$ and the coordinate data $(x_2, y_2)$. As such, the user can visually recognize the cat in the landscape image.

In a case in which the target image 50 is for example an image of a human, assignment of the teacher annotation 52 to the target image 50 can enable the data processing system 100 to be used for example for criminal identification.

The storage 24 includes a storage device that stores data and a computer program therein. Specifically, the storage 24 includes a main storage device such as semiconductor memory, and an auxiliary storage device such as semiconductor memory and/or a hard disk drive.

The storage 24 may include a removable medium. A processor of the controller 20 executes the computer program stored in the storage device of the storage 24 to control each element of the data processing device 2.

The storage 24 also stores therein a teacher model 54 that is the target image 50 with the teacher annotation 52, which specifies the target image 50, assigned thereto.

The storage 24 additionally stores a list 60 illustrated in FIG. 4 therein. The storage 24 registers a plurality of teacher models 54 in the list 60. A plurality of teacher models 54 including a teacher model 54(1) and a teacher model 54(2) can be registered in the list 60.

The teacher model 54(1) is associated with a teacher annotation 52 containing the coordinate data $(x_1, y_1)$ and the coordinate data $(x_2, y_2)$ representing the two points. The teacher model 54(2) is associated with a teacher annotation 52 containing coordinate data $(x_3, y_3)$ and coordinate data $(x_4, y_4)$ representing two points.

The teacher models 54 each serve as a sample or a teacher for specifying for example the cat from the landscape image in a manner that a later-described inferring section 32 bounds an inspection image 70 input from the image input section 26.

Next, the image input section 26 receives the inspection image 70 as illustrated in FIG. 2. The image input section 26 may acquire the inspection image 70 from the server 4 or the cloud 6. Alternatively, the image input section 26 may acquire the inspection image 70 from the outside via the Internet by the user operating the data processing device 2.

Alternatively, the image input section 26 may acquire the inspection image 70 for example from the security camera by the user operating the data processing device 2.

The security camera captures an image of a landscape. As illustrated in FIG. 5A, the landscape image includes the inspection image 70 as a part thereof. The inspection image 70 may be an image of a cat belonging to the same category to which the target image 50 belongs.

As illustrated in FIG. 2, the inferring section 32 assigns, to the inspection image 70 belonging to the same category to which the target image 50 belongs, an inferred annotation 72 that infers the inspection image 70 as illustrated in FIG. 5B based on the teacher model 54.

That is, the inferring section 32 references the list 60 illustrated in FIG. 4. The inferring section 32 references the teacher models 54 registered in the list 60 to infer an inferred annotation 72 that bounds the inspection image 70. The inferring section 32 assigns the inferred annotation 72 to the inspection image 70.

The inferred annotation 72 specifies the inspection image 70 by bounding the inspection image 70 with a rectangular frame as indicated by the broken line in FIG. 5B. The inferred annotation 72 contains coordinate data ($x_5$, $y_5$) and coordinate data ($x_6$, $y_6$) representing two points that define a boundary region of the inspection image 70 which can be defined by at least two points. The inferred annotation 72 is given by bounding called bounding box.

FIG. 5B illustrates an example in which the inferring section 32 correctly infers and bounds the area of the body of the cat that is the inspection image 70.

The entire body of the cat that is the inspection image 70 is included in the boundary region defined by the two points represented by the coordinate data ($x_5$, $y_5$) and the coordinate data ($x_6$, $y_6$). As such, the user can visually recognize the cat from the landscape image.

The storage 24 stores an inferred model 74 that is the inspection image 70 with the inferred annotation 72, which specifies the inspection image 70, assigned thereto.

The storage 24 further registers a plurality of inferred models 74 in the list 60 as illustrated in FIG. 6. An inferred model 74(1) and an inferred model 74(2) are registered in the list 60 in addition to the teacher model 54(1) and the teacher model 54(2). Additional inferred models 74 can be registered in the storage 24.

The inferred model 74(1) is associated with an inferred annotation 72 containing the coordinate data ($x_5$, $y_5$) and the coordinate data ($x_6$, $y_6$) representing the two points. The inferred model 74(2) is associated with an inferred annotation 72 containing coordinate data ($x_7$, $y_7$) and coordinate data ($x_8$, $y_8$) representing two points.

With reference to FIGS. 7A to 7C, another example of the inferring section 32 will be described next. FIG. 7A is a diagram illustrating an inspection image 80. FIG. 7B is a diagram illustrating an inferred annotation 82 to the inspection image 80. FIG. 7C is a diagram illustrating a corrected annotation 84 to the inspection image 80.

The inferring section 32 assigns, to an inspection image 80 in FIG. 7A belonging to the same category to which the target image 50 belongs, an inferred annotation 82 that infers the inspection image 80 as illustrated in FIG. 7B based on the teacher models 54.

That is, the inferring section 32 references the list 60 in FIG. 4. The inferring section 32 reference the teacher models 54 registered in the list 60 to infer an inferred annotation 82 that bounds the inspection image 80. The inferring section 32 assigns the inferred annotation 82 to the inspection image 80.

The inferred annotation 82 specifies the inspection image 80 by bounding the inspection image 80 with a rectangular frame as indicated by the broken line in FIG. 7B. The inferred annotation 82 contains coordinate data ($x_9$, $y_9$) and coordinate data ($x_{10}$, $y_{10}$) representing two points that define a boundary region of the inspection image 80 which can be defined by at least two points.

FIG. 7B illustrates an example in which the inferring section 32 incorrectly infers and bounds the area of the body of a cat that is an inspection image 70.

In FIG. 7B, a part of the body of the cat that is the inspection image 70 is included in the boundary region defined by the two points represented by the coordinate data ($x_9$, $y_9$) and the coordinate data ($x_{10}$, $y_{10}$). As such, the user may not understand what the image specified in the boundary region is.

To tackle the above problem, the aiding section 34 illustrated in FIG. 2 aids a human to determine whether or not the inferred annotation 82 specifies the inspection image 80. The aiding section 34 acquires a user instruction input through a non-illustrated mouse or a non-illustrated keyboard, for example.

The correcting section 36 illustrated in FIG. 2 generates a corrected model 86 in a manner to add a corrected annotation 84 to the inferred annotation 82 so that the inspection image 80 is specified. The corrected annotation 84 contains coordinate data ($x_{11}$, $y_{11}$) and coordinate data ($x_{12}$, $y_{12}$) representing two points that define a boundary region of the inspection image 80 which can be defined by at least two points. The corrected annotation 84 is given by bounding called bounding box.

That is, the user recognizes that the inferred annotation 82 illustrated in FIG. 7B is a result of incorrect inference. The user corrects the boundary of the inspection image 80 included in the landscape image using for example the mouse or the keyboard so that the inspection image 80 is specifiable as illustrated in FIG. 7C.

The correcting section 36 generates a corrected annotation 84 based on the boundary corrected by the user, and generates a corrected model 86.

The storage 24 stores the corrected model 86 that is the inspection image 80 with the corrected annotation 84, which specifies the inspection image 80, assigned thereto.

The storage 24 further registers a plurality of corrected models 86 in the list 60 as illustrated in FIG. 8. A corrected model 86(1), a corrected model 86(2), and a corrected model 86(3) are registered in the list 60 in addition to the teacher model 54(1), the teacher model 54(2), the inferred model 74(1), and the inferred model 74(2). Additional corrected models 86 can be registered in the storage 24.

The user notices for example that inference about the coordinate data ($x_{10}$, $y_{10}$) is incorrect out of the coordinate data ($x_9$, $y_9$) and the coordinate data ($x_{10}$, $y_{10}$) for the two points contained in the inferred annotation 82 in the corrected model 86(1). The user inputs coordinate data ($x_{11}$, $y_{11}$). The corrected annotation 84 is associated with the coordinate data ($x_{11}$, $y_{11}$) in addition to the coordinate data ($x_9$, $y_9$) and the coordinate data ($x_{10}$, $y_{10}$) for the two points. The corrected model 86(1) may contain a difference annotation between the coordinate data ($x_{10}$, $y_{10}$) and the coordinate data ($x_{11}$, $y_{11}$).

The user notices for example that inference about the coordinate data ($x_9$, $y_9$) is incorrect out of the coordinate data ($x_9$, $y_9$) and the coordinate data ($x_{10}$, $y_{10}$) for the two points contained in the inferred annotation 82 in the corrected model 86(2). The user inputs coordinate data ($x_{11}$, $y_{11}$). The corrected annotation 84 is associated with a corrected annotation 84 containing the coordinate data ($x_{11}$, $y_{11}$) in addition to the inferred annotation 82 containing the coordinate data ($x_9$, $y_9$) and the coordinate data ($x_{10}$, $y_{10}$) for the two points. The corrected model 86(1) may contain a difference annotation between the coordinate data ($x_9$, $y_9$) and the coordinate data ($x_{11}$, $y_{11}$).

The corrected model 86(3) indicates that both coordinate data ($x_{15}$, $y_{15}$) and coordinate data ($x_{16}$, $y_{16}$) representing two points are results of incorrect inference and both the coordinate data ($x_{15}$, $y_{15}$) and the coordinate data ($x_{16}$, $y_{16}$) representing the two points have been corrected.

In addition to the inferred annotation 82 containing the coordinate data ($x_{15}$, $y_{15}$) and the coordinate data ($x_{16}$, $y_{16}$) representing the two points, the corrected model 86(3) is associated with a corrected annotation 84 containing coordinate data ($x_{17}$, $y_{17}$) and coordinate data ($x_{18}$, $y_{18}$) representing two points. The corrected model 86(3) may contain a difference annotation between the coordinate data ($x_{17}$, $y_{17}$) or the coordinate data ($x_{18}$, $y_{18}$) and the coordinate data ($x_{15}$, $y_{15}$) and the coordinate data ($x_{16}$, $y_{16}$).

As illustrated in FIG. 2, the output section 38 outputs the teacher model 54, the inferred model 74, or the corrected model 86 then.

In the present embodiment, a corrected annotation 84 is added to an inferred annotation 82 that incorrectly specifies an inspection image 80. This favorably reduces correction operation on an inferred annotation 82 that incorrectly specifies the inspection image 80.

Figure 9:
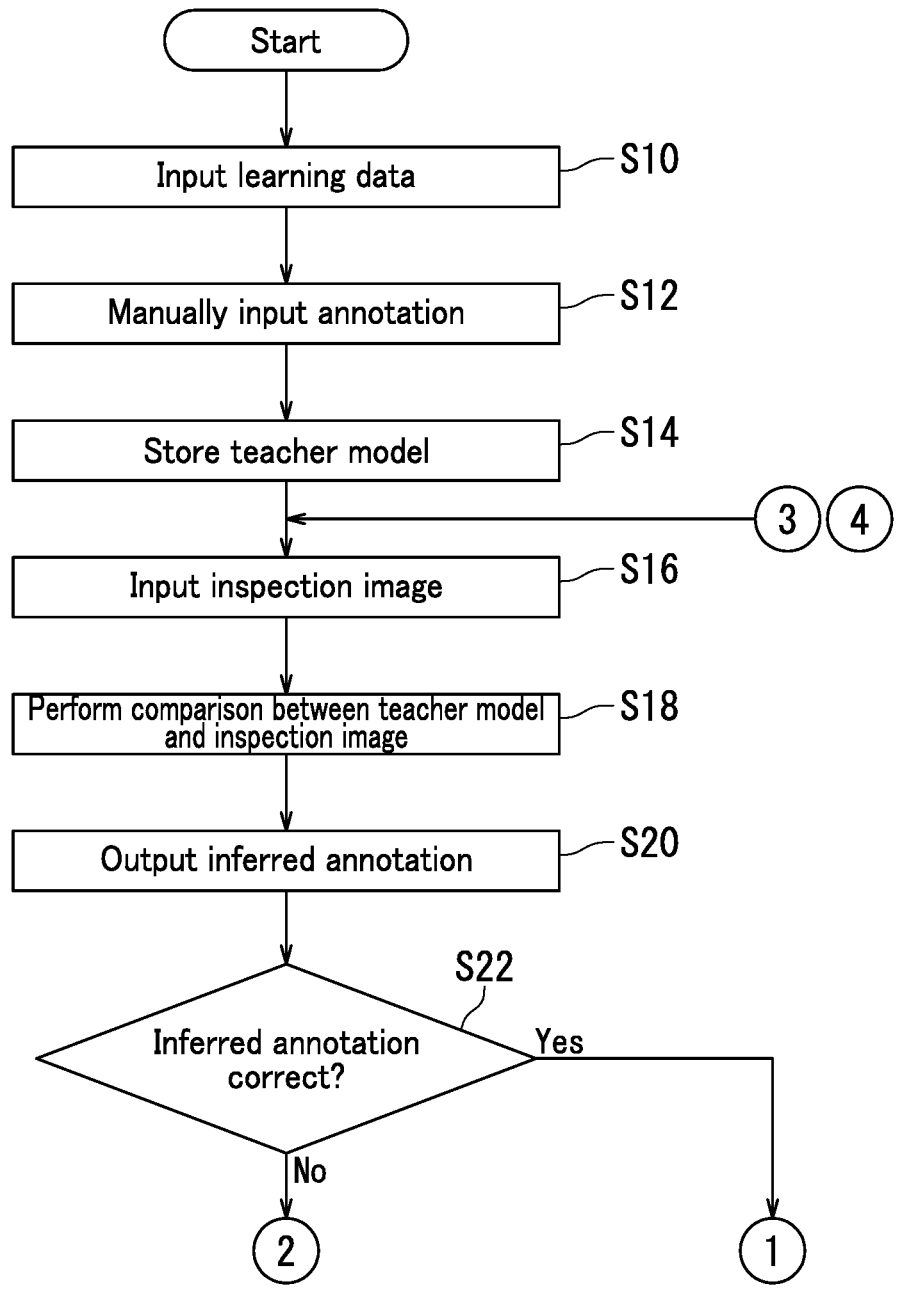
FIG. 9 is a flowchart depicting an operation performed by the data processing system of the embodiment.
Figure 10:
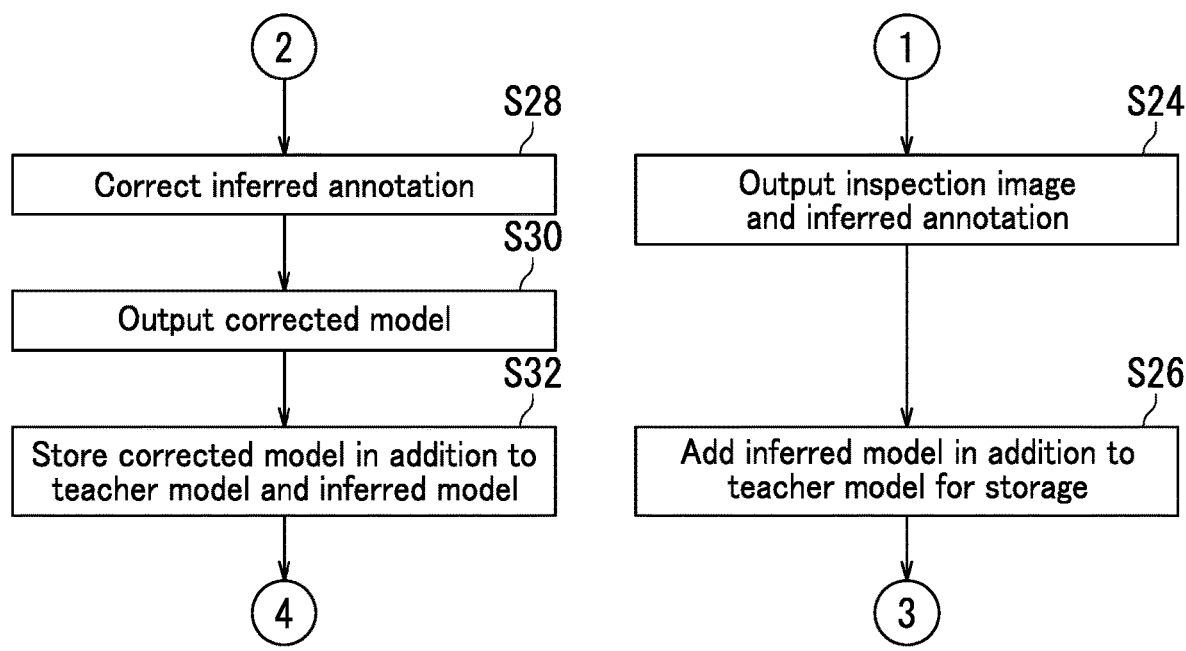
FIG. 10 is a flowchart depicting the operation performed by the data processing system of the embodiment.

The operation of the data processing system 100 according to the present embodiment will be described next with reference to FIGS. 9 and 10. FIGS. 9 and 10 depict a flowchart of the operation performed by the data processing system 100 in the present embodiment. As depicted in FIGS. 9 and 10, the operation includes Steps S10 to S32. Specifics are as follows.

In Step S10, learning data containing a target image 50 is input first as depicted in FIG. 9. The routine proceeds to Step S12.

In Step S12, the assigning section 30 assigns to the target image 50 a teacher annotation 52 manually input by the user. The assigning section 30 generates a teacher model 54. The routine proceeds to Step S14.

In Step S14, the storage 24 stores the teacher model 54. The routine proceeds to Step S16.

In Step S16, the image input section 26 receives an inspection image 70. The routine proceeds to Step S18.

In Step S18, the inferring section 32 performs comparison between the teacher model 54 and the inspection image 70. The routine proceeds to Step S20.

In Step S20, the inferring section 32 references the teacher model 54 and outputs an inferred annotation 82 or an inferred annotation 72 assigned to the inspection image 70. The routine proceeds to Step S22.

In Step S22, the user determines whether the inferred annotation 72 or the inferred annotation 82 is correct or not. The routine proceeds to Step S24.

If it is determined that the inferred annotation 72 is corrected in Step S22 (Yes in Step S22), the routine proceeds to Step S24 depicted in FIG. 10. If it is determined that the inferred annotation 82 is incorrected in Step S22 (No in Step S22), the routine proceeds to Step S28 depicted in FIG. 10.

If Yes in Step S22, the inferring section 32 outputs the inspection image 70 and the inferred annotation 72 in Step S24 depicted in FIG. 10. The routine proceeds to Step S26.

In Step S26, the storage 24 adds the inferred model 74 to the teacher model 54 and stores the resultant model. The routine proceeds to Step S16 depicted in FIG. 9.

If No in Step S22, the user inputs a corrected annotation 84 to add the corrected annotation 84 to the inferred annotation 82 using the aiding section 34 in Step S28 depicted in FIG. 10. The routine proceeds to Step S30.

In Step S30, the correcting section 36 outputs a corrected model 86. The routine proceeds to Step S32.

In Step S32, the storage 24 additionally stores the corrected model 86 in addition to the teacher model 54 and the inferred model 74. The routine proceeds to Step S16 depicted in FIG. 9.

Second Embodiment

Figure 11A:
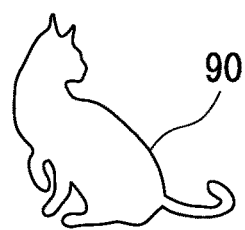
FIG. 11A is a diagram illustrating an inspection image in a data processing system of an embodiment.
Figure 11B:
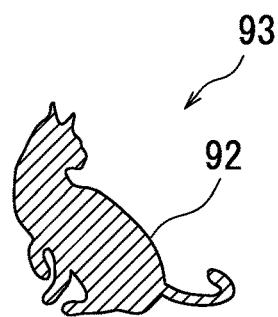
FIG. 11B is a diagram illustrating an inferred model in the data processing system.
Figure 11C:
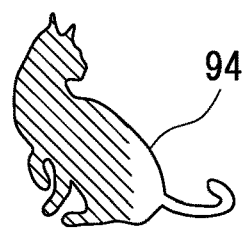
FIG. 11C is a diagram illustrating an inferred annotation in the data processing system.
Figure 11D:
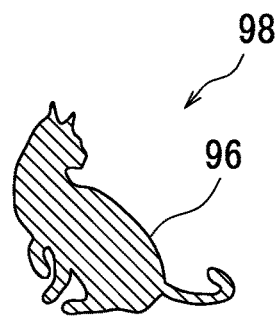
FIG. 11D is a diagram illustrating a corrected model in the data processing system.

A data processing system 100 according to a second embodiment will be described next with reference FIGS. 11A to 11D in addition to FIG. 2. FIG. 11A is a diagram illustrating an inspection image 90 in the data processing system 100 of the second embodiment. FIG. 11B is a diagram illustrating an inferred model 93 in the data processing system 100. FIG. 11C is a diagram illustrating an inferred annotation 94 in the data processing system 100. FIG. 11D is a diagram illustrating a corrected model 98 in the data processing system 100.

In the second embodiment, a teacher annotation 52, an inferred annotation 92, an inferred annotation 94, and a corrected annotation 96 are aggregated as image data that specifies a target image 50 and that defines a mask range for an inspection image 90. The teacher annotation 52, the inferred annotation 92, the inferred annotation 94, and the corrected annotation 96 are given by pixel masking called a semantic segmentation.

That is, the image input section 26 illustrated in FIG. 2 receives the inspection image 90 illustrated in FIG. 11A. The inferring section 32 references the teacher models 54 (FIG. 4) stored in the storage 24 and assigns the inferred annotation 92 to the inspection image 90 as illustrated in FIG. 11B. The inferring section 32 outputs an inferred model 93 that is the inspection image 90 with the inferred annotation 92 assigned thereto.

The inferred annotation 92 is an aggregation of pixel data (pixel position data, pixel color data) located in the mask range. FIG. 11B illustrates an example in which the area of the body of the cat is correctly masked as a result of correct inference by the inferring section 32.

Next, the inferring section 32 references the teacher models 54 stored in the storage 24 and assigns the inferred annotation 94 to the inspection image 90 as illustrated in FIG. 11C. FIG. 11C illustrates an example in which the area of the body of the cat is incorrectly masked as a result of incorrect inference by the inferring section 32.

The aiding section 34 aids a human to determine whether or not the inferred annotation 94 specifies the range of the inspection image 90.

As illustrated in FIG. 11D, the correcting section 36 illustrated in FIG. 2 generates a corrected model 98 in a manner to add the corrected annotation 96 to the inferred annotation 94 so that the area of the inspection image 90 is specified. The corrected annotation 96 contains an aggregation of pixel data that defines the boundary region of the inspection image 90.

That is, the user recognizes that the inferred annotation 94 illustrated in FIG. 11C is a result of incorrect inference. The user corrects the boundary for example using the mouse or the keyboard so that all pixels included within the outline of the inspection image 90 in the landscape image are selected as illustrated in FIG. 11D.

The correcting section 36 generates a corrected annotation 96 based on the boundary corrected by the user, and generates a corrected model 98.

In addition to the inspection image 90, the storage 24 stores the inferred model 93 and the corrected model 98 to which the corrected annotation 96 specifying the inspection image 90 is assigned.

Furthermore, the storage 24 registers a plurality of inferred models 93 and a plurality of corrected models 98 in the list 60 as illustrated in FIG. 8. Duplicate description about the list 60 is omitted.

Next, the output section 38 outputs the teacher model 54, the inferred model 93, or the corrected model 98 as illustrated in FIG. 2.

In the present embodiment, even in a case of inference of an inspection image 90 by semantic segmentation, a corrected annotation 96 is added to an inferred annotation 94 that incorrectly specifies the inspection image 90, thereby achieving favorable reduction in correction operation on an inferred annotation 94 that correctly specifies the inspection image 90.

Third Embodiment

A data processing system 100 according to a third embodiment will be described next with reference FIGS. 11A to 12 in addition to FIG. 2. FIG. 11A is a diagram illustrating a teacher model 107 in the data processing system 100 of the present embodiment. FIG. 11B is a diagram illustrating an inferred model 111 in the data processing system 100. FIG. 11C is a diagram illustrating a corrected model 117 in the data processing system 100. FIG. 12 illustrates a list 130 that the data processing device 2 has. The third embodiment is an example in which the data processing system 100 is used as a translation system.

Figure 12A:
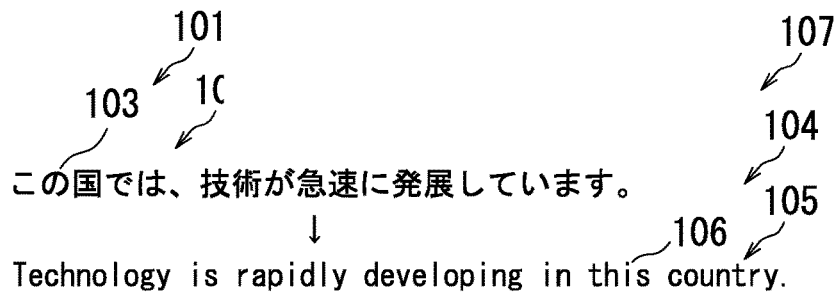
FIG. 12A is a diagram illustrating a teacher model in a data processing system of an embodiment.

In the third embodiment, a target image 101 exhibits a first sentence 102 described in a first language as illustrated in FIG. 12A. A teacher annotation 104 includes second phrases 106 that compose a second sentence 105 described in a second language and that are assigned by a human in one to one correspondence with first phrases 103 composing the first sentence 102.

Figure 12B:
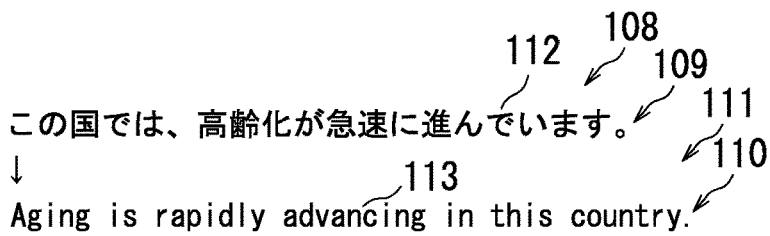
FIG. 12B is a diagram illustrating an inferred model in the data processing system.

As illustrated in FIG. 12B, an inspection image 108 exhibits a third sentence 109 described in the first language. An inferred annotation 110 includes fourth phrases 114 that compose a fourth sentence 113 and that are assigned based on a teacher model 107 in one to one correspondence with third phrases 112 composing the third sentence 109.

Figure 12C:
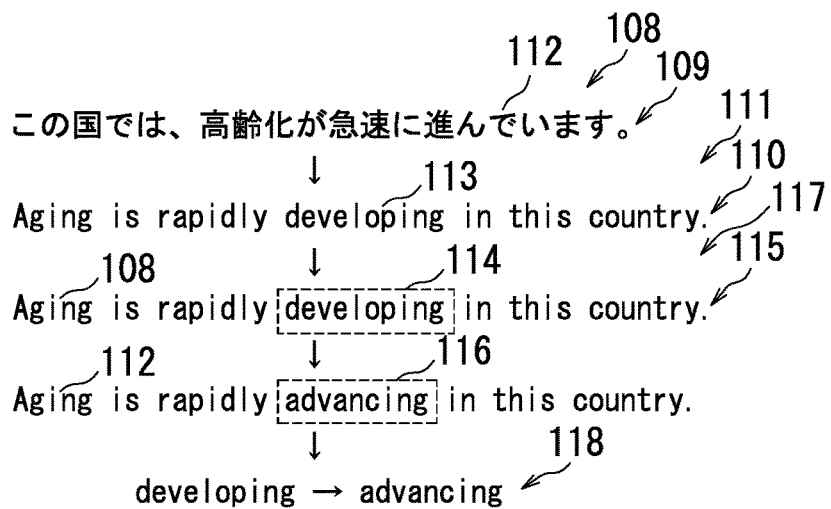
FIG. 12C is a diagram illustrating a corrected model in the data processing system.

As illustrated in FIG. 12C, a corrected annotation 115 includes fifth phrases 116 as a result of translation of the third phrases 112 into the second language by the human using the correcting section 36 in a case in which the human determines with the aid of the aiding section 34 that a fourth phrase 114 inferred in correspondence with a third phrase 112 by is incorrect.

The first language is Japanese, for example, as illustrated in FIG. 12A. The target image 101 is a character image of the first sentence 102 "この国では、技術が急速に発展しています。" described in Japanese. The first sentence 102 is composed of the first phrases 103 " この国では ", " 技術が ", " 急速に ", and " 発展しています。".

The second language is English, for example. The second sentence 105 is a character image "Technology is rapidly developing in this country." generated by translation of the first sentence 102 into English.

The second sentence 105 is composed of the second phrases 106 "Technology", "rapidly", "is developing", and "in this country". The teacher annotation 104 is assigned by the assigning section 30.

The storage 24 stores a teacher model 107 that is the target image 101 with the teacher annotation 104, which specifies the target image 101, assigned thereto.

The storage 24 additionally stores a list 130 as illustrated in FIG. 13. The storage 24 registers a teacher model 107(1) in the list 130. Additional teacher models 107 can be registered in the list 130.

The image input section 26 receives an inspection image 108. As illustrated in FIG. 12B, the inspection image 108 is a character image of the third sentence 109 "この国では、高齢化が急速に発展しています。" in Japanese. The third sentence 109 is composed of the third phrases 112 " この国では ", " 高齢化が ", " 急速に ", and " 発展しています。".

The inferring section 32 translates the third phrases 112 "この国では、高齢化が急速に進んでいます。" into the fourth sentence 113 "Aging is rapidly advancing in this country." based on the teacher model 107. The third sentence 109 is described in Japanese, for example. The fourth sentence 113 is described in English, for example.

That is, the inferring section 32 references the list 130 illustrated in FIG. 13. The inferring section 32 references the teacher models 107 registered in the list 130 to assign to the inspection image 108 an inferred annotation 110 inferred from the inspection image 108.

The inferred annotation 110 includes fourth phrases 114 "Aging", "rapidly", "is advancing", and "in this country" composing the fourth sentence 113 translated based on the teacher model 107 in one to one correspondence with the third phrases 112 " この国では ", " 高齢化が ", " 急速に ", " 発展しています。" composing the third sentence 109.

The storage 24 stores an inferred model 111 that is the inspection image 108 with the inferred annotation 110, which specifies the inspection image 108, assigned thereto.

The storage 24 additionally registers the inferred model 111 in the list 130 as illustrated in FIG. 13. The inferred model 111(1) is registered in the list 130 in addition to the teacher model 107(1). Additional inferred models 111 can be registered in the storage 24.

Registration of the inferred model 111(1) in the list 130 of the storage 24 means that translation by the inferring section 32 is correct.

In another example, the inferring section 32 translates based on the teacher model 107 the third phrases 112 " この国では、高齢化が急速に進んでいます。" into a fourth sentence 113 "Aging is rapidly developing in this country" as illustrated in FIG. 12C.

As illustrated in FIG. 12C, a third phrase 112 " 進んでいます。" may be incorrectly translated into English as a fourth phrase 114 "developing".

In a situation as above, the aiding section 23 illustrated in FIG. 2 aids a human to determine whether or not the inferred annotation 110 presents correct English translation of the inspection image 108.

The correcting section 36 illustrated in FIG. 2 adds a corrected annotation 115 to the inferred annotation 110 so that the incorrect translation presented in the inspection image 108 is corrected, and generates a corrected model 117. The corrected annotation 115 includes a fifth phrase 116 "advancing" to which the fourth phrase 114 "developing" has been corrected.

That is, the user recognizes that the inferred annotation 110 illustrated in FIG. 12C is a result of incorrect inference. The user corrects the fourth phrase 114 "developing" to the fifth phrase 116 "advancing" as illustrated in FIG. 12C using for example the mouse or the keyboard.

The correcting section 36 generates a corrected annotation 115 based on user correction, and generates a corrected model 117.

The storage 24 stores the corrected model 117 that is the inspection image 108 with the corrected annotation 115, in which mistranslation in the inferred annotation 110 has been corrected, assigned thereto.

The storage 24 registers additional corrected models 117 in the list 130 as illustrated in FIG. 13. A corrected model 117(1) is registered in the list 130 in addition to the teacher model 107(1) and the inferred model 111(1). Additional corrected models 117 can be registered in the storage 24.

The correcting section 36 may generate based on user correction a difference annotation 118 indicating a difference between the fourth phrase 114 "developing" and the fifth phrase 116 "advancing".

The storage 24 may include the difference annotation 118 in the corrected model 117 registered in the list 130.

Next, the output section 38 outputs the teacher model 107, the inferred model 111, or the corrected model 117 as illustrated in FIG. 2.

Embodiments of the present invention have been described so far with reference to the drawings. However, the present invention is not limited to the above embodiments and can be practiced in various manners within a scope not departing from the gist of the present invention. Furthermore, appropriate combination of elements of configuration described in the above embodiments can form various inventions. For example, some of the elements of configuration indicated in an embodiment may be omitted. Alternatively or additionally, any elements of configuration in different present embodiments may be combined as appropriate. The drawings schematically illustrate elements of configuration in order to facilitate understanding. The properties such as the number of each element of configuration illustrated in the drawings may differ from the actual properties thereof in order to facilitate preparation of the drawings. Also, the shape and the like of each element of configuration indicated in the embodiments are examples and not intended as specific limitations. Various alterations may be made within a scope not substantially departing from the configuration of the present invention.

INDUSTRIAL APPLICABILITY

The present invention is applicable to fields of data processing systems and data processing methods.

The invention claimed is:

1. A data processing system comprising:
storage that stores therein a teacher model that is a target image with a teacher annotation assigned thereto, the teacher annotation specifying the target image;
an inferring section configured to assign an inferred annotation to an inspection image belonging to a same category to which the target image belongs, the inferred annotation being a result of inference from the inspection image based on the teacher model;
an aiding section configured to aid a human to determine whether or not the inferred annotation specifies the inspection image; and
a correcting section configured to generate a corrected model in a manner to add a corrected annotation to the inferred annotation so that the inspection image is specified, wherein
the target image exhibits a first sentence described in a first language,
the teacher annotation includes a second phrase composing a second sentence described in a second language, the second phrase being assigned by a human in one to one correspondence with a first phrase composing the first sentence,
the inspection image exhibits a third sentence described in the first language,
the inferred annotation includes a fourth phrase composing the second sentence, the fourth phrase being inferred based on the teacher model in one to one correspondence with a third phrase composing the third sentence, and
the corrected annotation includes a fifth phrase translated into the second language from the third phrase by the human using the correcting section upon the human determining with aid of the aiding section that the fourth phrase inferred from the third phrase is incorrect.

2. The data processing system according to claim 1, further comprising:
a data input section configured to receive the target image;
an assigning section configured to assign the teacher annotation to the target image; and
an image input section configured to receive the inspection image.

3. The data processing system according to claim 1, wherein
each of the teacher annotation, the inferred annotation, and the corrected annotation contains the target image and coordinate data representing at least two points that define a boundary region of the inspection image.

4. The data processing system according to claim 1, wherein
each of the teacher annotation, the inferred annotation, and the corrected annotation contains the target image and pixel data that defines a mask range of the inspection image.

5. The data processing system according to claim 1, wherein
the storage further stores the corrected model.

6. The data processing system according to claim 1, wherein
the storage further stores a difference annotation indicating a difference between the corrected annotation and the inferred annotation.

7. A data processing method comprising:
inputting a target image;
assigning to the target image a teacher annotation that specifies the target image;
storing a teacher model that is the target image with the teacher annotation assigned thereto;
inputting an inspection image;
assigning an inferred annotation to the inspection image belonging to a same category to which the target image belongs, the inferred annotation being a result of inference from the inspection image based on the teacher model;
aiding a human to determine whether or not the inferred annotation specifies the inspection image; and
generating a corrected model in a manner to add a corrected annotation to the inferred annotation so that the inspection image is specified, wherein
the target image exhibits a first sentence described in a first language,
the teacher annotation includes a second phrase composing a second sentence described in a second language, the second phrase being assigned by a human in one to one correspondence with a first phrase composing the first sentence,
the inspection image exhibits a third sentence described in the first language,
the inferred annotation includes a fourth phrase composing the second sentence, the fourth phrase being inferred based on the teacher model in one to one correspondence with a third phrase composing the third sentence, and the corrected annotation includes a fifth phrase translated into the second language from the third phrase by the human upon the human determining that the fourth phrase inferred from the third phrase is incorrect.

* * * * *